UNITED STATES PATENT OFFICE.

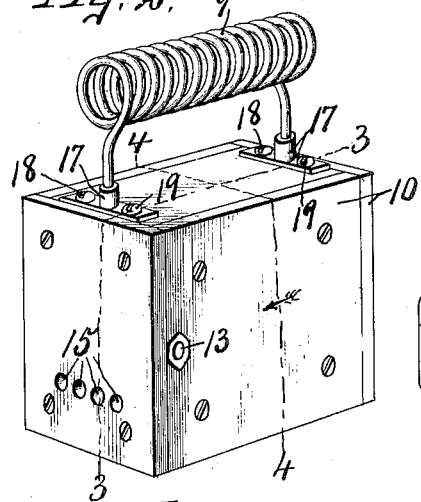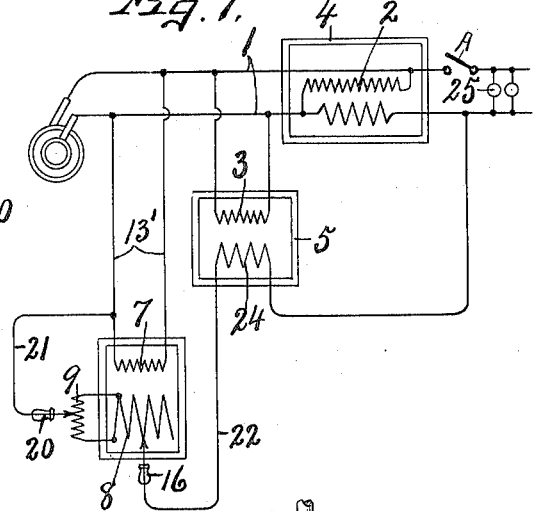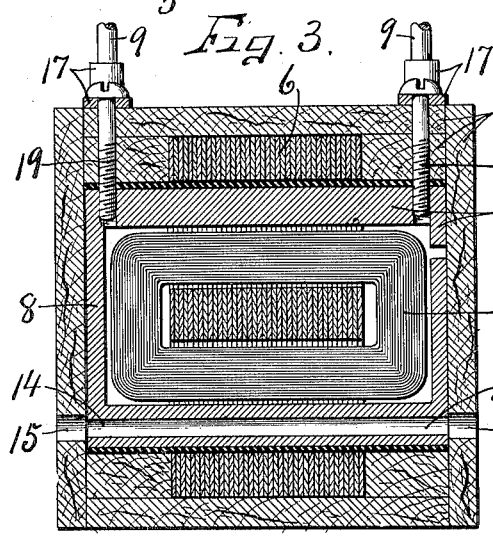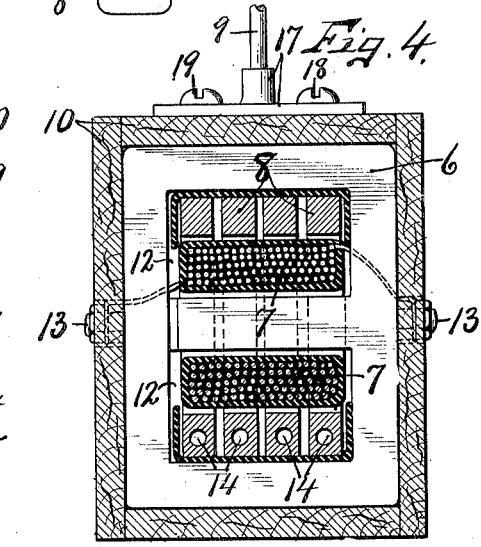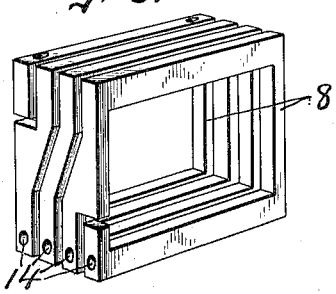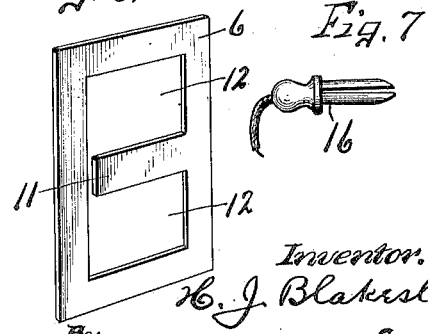

HENRY J. BLAKESLEE, OF SYRACUSE, NEW YORK.

ELECTRICAL TESTING APPARATUS.

950,714.     Specification of Letters Patent.     Patented Mar. 1, 1910.

Application filed February 23, 1909. Serial No. 479,489.

*To all whom it may concern:*

Be it known that I, HENRY J. BLAKESLEE, of Syracuse, in the county of Onondaga, in the State of New York, have invented new and useful Improvements in Electrical Testing Apparatus, of which the following, taken in connection with the accompanying drawings, is a full, clear, and exact description.

This invention relates to certain improvements in apparatus for testing electric meters and analogous instruments, but more particularly for testing watt hour meters.

I am aware that in making the latter tests it is customary to use a portable load consisting of lamps or other translating devices which not only consume an electrical energy equal to that registered by the meter under test, but in testing the larger meters these energy consuming devices either become too bulky for convenient portability and manipulation or operate at too high a temperature for safety. In testing alternating current watt hour meters I find that this consumption of energy is unnecessary providing the current coils of the meter under test and standard meter are supplied in series with an alternating current from any source under such conditions that the potential stresses, phase relations and wave forms are equivalent to those obtaining under normal methods of testing. These equivalent conditions may be obtained by the use of an alternating current transformer having its primary winding supplied with the same potential which is impressed upon the meter, and the secondary supplying current to the current coils of the meter under test and standard meter.

My main object, therefore, is to provide a more efficient and practicable meter testing apparatus comprising a simple, compact and easily portable transformer of small watt capacity and preferably of the strictly potential type in which the core magnetization may be constant.

Another object is to obtain control over the secondary current throughout the entire range of its capacity through the medium of suitable contacts which may be easily and quickly adjusted thereby economizing in time and labor in making the necessary thorough tests.

The object in using a "potential transformer" as distinguished from the so-called "current transformer" is to obviate the use of delicate resistance in series with a primary in order to obtain complete regulation of the secondary current and at the same time to avoid varying magnetic densities and also varying and uncertain wave forms in the secondary circuit incidental to the use of such resistance in the primary, thereby obviating the relatively small non-inductive resistance and consequent increased lag of the secondary current. In other words I have sought to eliminate any resistance as such in series with the primary, allowing the transformer to operate under constant magnetization for all loads and permitting control of the secondary by non-inductive resistance in series with the meter coils, thereby reducing the lag of the secondary current to a negligible quantity by introducing a properly designed resistance in shunt with the secondary winding of the transformer, or rather by connecting such resistance across a portion of such secondary winding whereby any amount of current from zero to the maximum capacity of the transformer may be obtained by connecting one of the contacts to different points of the resistance, and the other contact to different points of the secondary winding, thus obviating the use of a much higher resistance which otherwise would be necessary, and which would also necessarily be either too fragile or bulky, or both, to accomplish the same control.

A still further object is to utilize the resistance coil as a handle by which the transformer may be conveniently carried from place to place.

Other objects and uses will be brought out in the following description:

In the drawings—Figure 1 is a diagrammatic view of a watt-hour meter under test, a standardized meter and my improved testing apparatus electrically connected to said meters. Fig. 2 is a perspective view of the detached testing apparatus exclusive of the electrical connections and contacts. Figs. 3 and 4 are respectively longitudinal and transverse vertical sectional views taken through the testing apparatus shown in Fig. 2 taken on lines 3—3 and 4—4 Fig. 2. Fig. 5 is a perspective view of the detached secondary winding of the transformer. Fig. 6 is a perspective view of one of the laminæ of the same transformer. Fig. 7 is an elevation of the detached contact plug.

In illustrating the operation of my invention I have shown diagrammatically in Fig. 1 a working circuit —1— in which are connected potential coils or windings —2— and —3— of a meter —4— under test and a standardized meter —5— respectively, the series or current coil of the meter under test being connected in the usual manner in series with one side of the working circuit, while the series or current coil of the standardized meter is adapted to be connected in series with the secondary winding of my improved testing apparatus presently described, and is, therefore, indirectly connected in series with the same side of the working circuit as the current coil of the meter under test.

The testing apparatus comprises in this instance an alternating current potential transformer consisting of a laminated core —6—, a primary winding —7—, a secondary coil —8— and an external resistance coil —9— which is connected across and in shunt with a portion of the secondary winding —8—, as best seen in Figs. 1, 2 and 3, all of said parts being brought together in compact size and form and inclosed within a suitable house or casing —10— to conceal and protect the major ports of the transformer, thereby constituting a comparatively small and easily portable testing apparatus.

The core —6— comprises a suitable number of thin magnetizable frames or laminæ arranged side by side in close proximity and provided with central tongues —11— upon which the primary coil —7— is wound, leaving suitable openings —12— of ample size to receive said primary and secondary coils.

The primary winding —7— preferably consists of a large number of turns of comparatively small wire having its ends secured to suitable terminals —13— which are adapted to be connected by wires —13'— across the working circuit —1— between the source of electric energy and meter —4— under test, although in some instances the primary may be connected to some other suitable source of electric energy if desired. The secondary winding —8— surrounds the primary winding and preferably consists of a small number of turns of comparatively coarse low resistance conducting material, such as cast brass or copper, passing through the openings —12— in the core, each turn being provided with one or more apertures —14— preferably in opposite ends thereof and registering with similar openings —15— in the adjacent sides of the inclosing case —10— for the reception of a contact terminal or plug —16—.

The resistance coil —9— preferably consists of a suitable length of comparatively coarse German silver or equivalent wire having its opposite ends electrically connected across a portion of the secondary coil —8—, and in order that this resistance coil may perform its electrical function and at the same time serve as a convenient handle by which the transformer may be easily carried from place to place the ends of the coil are firmly secured in suitable metal conducting plates —17— which in turn are secured to the top of the case —10— by suitable fastening means, as screws —18—, and are electrically connected to one side of one of the turns of the secondary coil —8— by screws —19— thereby affording a secure anchorage for the resistance coil or handle —9— and at the same time permitting said coil to be readily removed or replaced when necessary. This resistance coil —9— is of such design and construction as to carry the whole or any part of the secondary current of the transformer without excessive heating, and at the same time is sufficiently rugged and durable to permit it to be used as a handle for carrying the transformer from place to place, said resistance being adapted to be connected to the external circuit in which the meter under test is located by means of an adjustable contact member —20— and wire —21—, the contact member being movable into and out of contact with any one of the turns of the coil —9— as may be necessary in testing the meter —4—. In like manner the contact plug —16— may be connected at different points to any one of the turns of the secondary coil —8— and is in this instance connected by a wire —22— through the series coil, as —24—, of the standard meter to the same side of the working circuit in which the series coil of the meter under test is connected, but preferably between the meter and load, such as translating devices —25—.

By connecting the resistance —9— in the manner described across a portion of the secondary winding, a closed local circuit is formed including the resistance and that portion of the secondary winding between the points of connection with the resistance due to the electromotive force in that part of the winding. The resistance must, therefore, be sufficient to reduce the local current in the closed local circuit to a negligible value.

In order that the load of the translating devices —25— may be cut out during the testing operation, I provide the working circuit —1— with a switch —A— which, in this instance, is shown as located between the translating devices —25— and meter under test.

It is now apparent that when the transformer is connected in the manner described, with the specially designed resistance coil —9— connected across a portion of the secondary winding, any amount of current from zero to the maximum capacity of the transformer may be passed through the apparatus under test by simply connecting the contact members to different points of the resistance and to different points of the secondary winding, thereby obviating excessive weight and bulk and keeping the resistance and heat under maximum current tests to a minimum or safe degree. It is also apparent that by connecting the transformer to the working circuit in the manner shown and described, the primary circuit of the transformer is supplied with the same potential which is impressed upon the meter, and by shifting the contact members —16— and —20— into and out of contact with different points or turns of their respective coils, any amount of current from zero to the maximum capacity of the transformer may be impressed upon both meters simultaneously, thereby assuring a thorough and practical test of the watt hour meter or other apparatus under test, and enabling such test to be made quickly and economically and without special skill in the art of handling such apparatus.

In making the test it is simply necessary to connect the potential coil of the standard meter —5— across the working circuit —1— and to similarly connect the primary winding of the transformer across the same working circuit or to any other suitable source of electrical energy and to then place the contact members —16— and —20— in contact with the desired points of the secondary winding —8— and resistance coil —9— respectively, the positioning of the contact members —16— and —20— depending entirely upon the amount of current required to make the desired test, the secondary current being controlled by electrically connecting the contact members to different points of their respective coils, the condition of the meter under test being determined by comparing its registration with that of the standardized meter —5—. It is evident, however, that the mechanical elements and electrical connections of the testing apparatus are susceptible to many modifications within the scope of my invention, and, therefore, I do not limit myself to the precise construction and arrangement shown and described.

What I claim is:—

1. In an electrical testing apparatus, a transformer having a handle of electric conducting material connected across a portion of its secondary winding.

2. In an electrical testing apparatus, an alternating current transformer having a handle consisting of an electrical resistance connected to its secondary winding.

3. In an electrical testing apparatus, a transformer having an electrical resistance connected in shunt to its secondary winding in combination with an external circuit having adjustable contacts with the resistance and secondary winding respectively and including a portion of the instrument under test.

4. In an electrical testing apparatus, an alternating current transformer having an electric conducting handle consisting of a resistance coil connected in shunt to a portion of its secondary winding.

5. In an electrical testing apparatus, an alternating current transformer a fixed resistance connected across a portion of the transformer, and an external circuit having a contact member making contact with the secondary winding of the transformer and an additional contact member contacting with the resistance.

6. An alternating current transformer having recesses in different portions of its secondary winding, and means for entering said recesses and making a slip contact with the adjacent portion of the secondary winding.

7. In an electrical testing apparatus an alternating current transformer having an electrical resistance electrically connected across a portion of its secondary winding, and an external circuit having separate contact members movable to make contact with different portions of the resistance and with different points in the secondary winding respectively.

8. In an electrical testing apparatus, a transformer having at least some of the turns of its secondary winding provided with apertures, an external circuit including a portion of the instrument under test and a plug adapted to be inserted in either of said apertures and having contact with the secondary winding and a resistance connected across a portion of the secondary winding and to said circuit.

9. In an electrical testing apparatus, a transformer, a resistance connected at two points to a portion of the secondary of the transformer and constituting a closed circuit, and a separate circuit including therein a portion of the instrument under test, a portion of the secondary winding and a portion of the resistance and also including leads to such instrument, one of said leads being connected to the secondary of the transformer and the other lead to a point on said resistance between the two first mentioned points.

10. In an electrical testing apparatus, a transformer, a resistance, two points of which are connected to the secondary of said transformer and constitute a closed circuit including such resistance and the portion of the secondary winding of the transformer between such points, and an additional circuit connecting a portion of said secondary and resistance and also connected to a portion of the instrument under test, and leads thereto, one of said leads being connected to the secondary and the other lead connected to said resistance at a point between the two first mentioned points.

In witness whereof I have hereunto set my hand this 18th day of February, 1909.

HENRY J. BLAKESLEE.

Witnesses:
H. E. CHASE,
JESSIE M. HOES.